July 6, 1926. 1,591,211
J. W. BRENKERT ET AL
ILLUMINATING APPARATUS
Filed Feb. 15, 1926
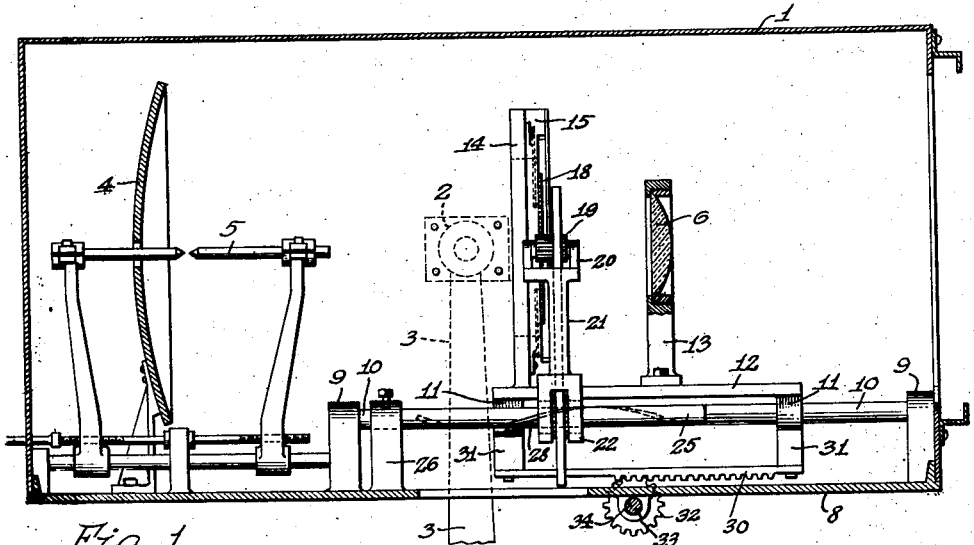
Fig.1.
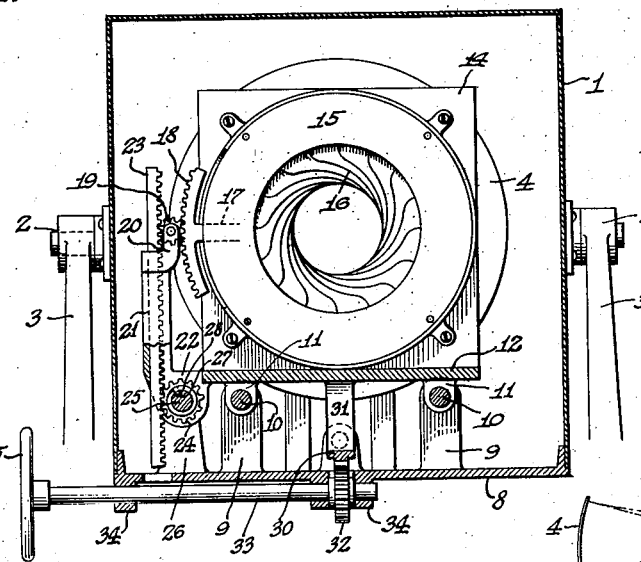
Fig.2.
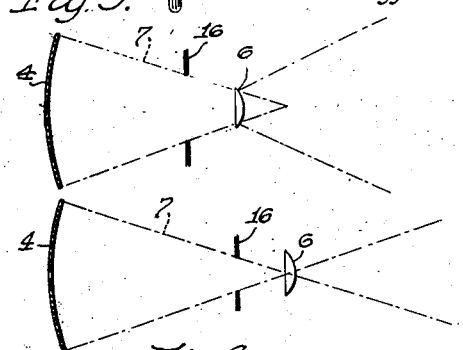
Fig.3.
Fig.4.
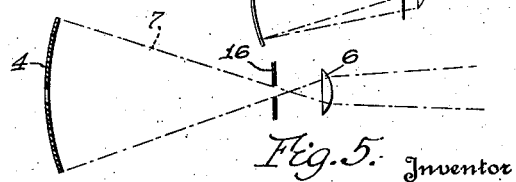
Fig.6.
Fig.5.
Inventor
Karl Brenkert,
Joseph W. Brenkert,
By
Attorneys Patented July 6, 1926.

1,591,211

UNITED STATES PATENT OFFICE.

JOSEPH W. BRENKERT AND KARL BRENKERT, OF HIGHLAND PARK, MICHIGAN.

ILLUMINATING APPARATUS.

Application filed February 15, 1926. Serial No. 88,371.

This invention relates to illuminating apparatus and has special reference to that class of light projecting devices wherein a source of light is reflected to a lens for light projection varying from a beam to a flood dispersion, and such apparatus is extensively used in theaters to provide a variety of stage lighting effects, for instance from a small spot light to a complete full illumination of the stage. In this type of apparatus and indeed in any type of illuminating apparatus wherein a source of light is reflected to a lens, there is a light aberration which decreases the intensity of the light to be projected. It is easy enough to interpose a shutter or diaphragm having a small opening to produce a small beam, but when a beam is projected a considerable distance there is not sufficient intensity of light to provide desired illumination at a distance. Placing a shutter in a luminous cone reduces the cross section of the cone and cuts off marginal reflected rays with the result that the intensity of the light source is materially reduced in the projected beam resulting from the apertured shutter.

Again in such illuminating apparatus it is practically impossible to change lenses for different kinds of light projection so the lens is ordinarily adjusted relative to the source of light so that for beam projection the foci is between the reflector and the lens; in front of the lens for flood projection, and at the lens for projection intermediate that of flooding and spotting. In all these instances there are stray light rays emitted from the luminous cone and these stray light rays reduce the intensity of the refracted rays emanating from the lens.

To eliminate the light aberration referred to above, increase the intensity of the light projection, facilitate operations in connection with illuminating apparatus, and provide a wider range of illumination under more perfect conditions for a spotting or flooding light projection are the main purposes of our invention which will be better understood when the construction of the apparatus is described by aid of the drawing, wherein—

Figure 1 is a longitudinal sectional view of the illuminating apparatus;

Fig. 2 is a cross sectional view of the same, and

Figs. 3 to 6 inclusive are diagrammatic views of light projection.

The illuminating apparatus necessarily includes certain structures that may be considered of a conventional form and these are a housing 1 ordinarily trunnioned, as at 2, in a yoke or support 3 that may be rotatably supported for swinging the housing from side to side while it may be tilted in the yoke or fork and by such universal movement serving a large area for illuminating purposes. In the rear end of the housing 1 is ordinarily a stationary reflector or mirror 4 of the parabolic or convexo concave type with an adjustable source of light 5 in front of the reflector and as an example of such source of light we have shown a carbon holder for carbons adapted to produce an electrical arc when in circuit with a suitable source of electrical energy.

In the forward part of the housing is ordinarily a condenser lens 6 and in Figs. 3 to 6 inclusive we show various positions of this lens relative to a luminous cone 7 formed by light rays reflected from the reflector 4. The position of the lens shown in Fig. 3 affords a flood or wide dispersion of light rays, and with the lens moved outwardly from the foci of the luminous cone a beam or spot light projection is obtained, while in Fig. 4 is shown one of many light projections between the maximum and approximate minimum illustrated in Figs. 3 and 5 respectively. Adjustment of the lens 6 may be accomplished in various ways, but since we intend to translate the linear movement of the lens to an oscillatory movement for shutter parts, we illustrate, as an example, a special mounting for the lens and a shutter.

On the bottom wall 8 of the housing 1 are sets of bearings 9 for parallel stationary rods 10. Slidable on these rods are the bearings 11 of a platform 12 and mounted on said platform is a holder 13 for the lens 6.

On the platform 12, at a predetermined distance behind the lens 6, is a support 14 for a conventional form of iris diaphragm shutter 15 including a multiplicity of plates or aperture members 16 which may be adjusted to provide apertures of various sizes when an oscillatory movement is imparted to a shutter actuating member 17 projecting from the side of the shutter housing. The shutter actuating member 17 is provided with a sector or arcuated rack 18 meshing with a pinion 19 rotatable in a bearing 20, carried by a pinion cage 22. Slidable in the upright 21 is a vertically disposed rack 23 meshing with the pinion 19 and with a pinion 24 in the cage 22. The pinion 24 is slidable on a spirally grooved guide rod 25 mounted in a support 26, carried by the bottom wall 8 of the housing 1. The pinion 24 has a pin or stud 27 extending into the groove 28 of the guide rod 25, said guide rod constituting a spiral member by which rotation may be imparted to the pinion 24 when shifted longitudinally of the guide rod by movement of the platform relative to said guide rod. For moving the platform 12 there is a longitudinally disposed rack 30 supported by hangers 31 from the platform 12. Meshing with the rack 30 is a pinion 32 mounted on a shaft 33, journaled in bearings 34, carried by the bottom wall 8 of the housing 1. On the shaft 33 is a hand wheel 35 by which it may be conveniently rotated to reciprocate the platform 12 and cause such motion to be translated for an oscillatory movement of the shutter actuating member 17. The translating mechanism is designed so that the adjustment of the shutter will be at a predetermined ratio to bodily movement of the shutter and lens and obviously such adjustments are in synchronism and controlled by the hand wheel 35.

We have previously stated that a shutter 16, shown in Fig. 6, may intersect the luminous cone 7, to provide a light projecting aperture behind the lens 6 and thus reduce the cross section of the beam projected by the lens 6, but it will be noted that those reflected light rays impinging against the rear side of the shutter are practically wasted or produce a light aberration which is not desirable in connection with any form of light projecting machine. Not only is there a light aberration but a reduction in the intensity of the reflected light which results in a weak beam possessing very little illuminating value at a distance. To still obtain a desired spot light or beam projection without decreasing the intensity of the reflected rays and without causing stray light rays to interfere with such light intensity as we obtain, we have provided the adjustable shutter and arranged it so as to be automatically adjusted in accordance with the position of the lens 6 relative to the reflector 4. This is best brought out in Figs. 3 to 5 inclusive showing different positions of the lens 6 relative to the reflector 4 and in each instance the diaphragm shutter provides an aperture approximately the cross section of a luminous cone. The shutter does not extend into the luminous cone nor is it spaced therefrom but provides a positive barrier for those rays which come from the outer portion of the luminous cone and under ordinary circumstances proceed in such divergent directions as to render it practically possible to light up, though unequally, surrounding spaces, thus detracting from the value of the luminous cone for light projecting purposes. We believe we are the first to provide a focusing device including a lens and shutter and wherein the shutter is automatically adjusted relative to a luminous cone during adjustment of the lens relative to a reflector. Obviously there are various types of shutters that might be employed and probably a different kind of translating mechanism, therefore we do not care to confine our invention to any details of construction other than mentioned in the appended claims.

What we claim is:—

1. In an illuminating apparatus wherein a lens and an adjustable shutter have a constant relation and are adapted to be bodily shifted relative to a luminous cone to regulate the projection of light:—adjustable means adapted for bodily shifting said lens and shutter, and means operated from said adjustable means adapted to adjust said shutter relative to said luminous cone.

2. An illuminating apparatus as called for in claim 1, wherein said shutter is of the iris diaphragm type adapted to provide a light emitting opening corresponding to a cross section of the luminous cone.

3. An illuminating apparatus as called for in claim 1, wherein said shutter is of the iris diaphragm type and linear movement of said lens and shutter as a unit is translated to oscillatory movement for shutter parts alone.

4. In an illuminating apparatus, wherein a source of light is reflected to a lens for light projection varying from a beam to a flood dispersion, and wherein the reflected light is interrupted to provide a path of light projection:—a shutter adapted to interrupt the reflected light, said shutter being adjustable, and means adapted to bodily and simultaneously move said lens and shutter relative to said source of light and adjust said shutter proportionally to the movement of said lens and shutter so that the intensity of the reflected light is confined to the lens.

5. In an illuminating apparatus, a sourc of reflected light, a focusing device including an adjustable shutter, and means adapted to simultaneously move said focusing device relative to said source of reflected light and adjust said shutter.

6. An illuminating apparatus as called for in claim 5, wherein said shutter is of the iris diaphragm type.

7. An illuminating apparatus as called for in claim 5, wherein said focusing device and said shutter have a constant proportional movement by which any aberration of light rays is confined to the source of reflected light.

In testimony whereof we affix our signatures.

KARL BRENKERT.
JOSEPH W. BRENKERT.